(12) United States Patent
DeRoller (10) Patent No.: US 8,730,521 B2
(45) Date of Patent: May 20, 2014

(54) METHOD AND APPARATUS FOR USING GAME MECHANICS TO IMPLEMENT ENTERPRISE PRINT GOVERNANCE

(75) Inventor: Matthew H. DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 156 days.

(21) Appl. No.: 13/427,115

(22) Filed: Mar. 22, 2012

(65) Prior Publication Data

US 2013/0250315 A1 Sep. 26, 2013

(51) Int. Cl.
*H04N 1/60* (2006.01)
*G06K 15/02* (2006.01)

(52) U.S. Cl.
USPC .......................................... 358/1.9; 358/1.15

(58) Field of Classification Search
USPC ................. 358/1.9, 1.15, 401, 406, 501, 504; 705/317, 400, 412; 713/320, 300, 324, 713/340, 321; 700/286, 295, 298, 300; 702/60, 61, 62, 63
See application file for complete search history.

(56) References Cited

U.S. PATENT DOCUMENTS

| | | | |
|---|---|---|---|
| 8,010,815 B2 * | 8/2011 | Hamilton et al. | 713/320 |
| 8,400,661 B2 * | 3/2013 | Grasso et al. | 358/1.15 |
| 2010/0211513 A1 * | 8/2010 | Yoshida | 705/317 |
| 2013/0163034 A1 * | 6/2013 | Snow et al. | 358/1.15 |

* cited by examiner

*Primary Examiner* — Charlotte M Baker (57) ABSTRACT

A method, non-transitory computer readable medium, and apparatus for processing a request to print using game mechanics are disclosed. For example, the method receives one or more parameters associated with the request to print, calculates a score for the request to print based upon the one or more parameters, updates an overall score of a user associated with the request to print based upon the score that is calculated and presents the overall score that is updated to a display device of the user.

18 Claims, 4 Drawing Sheets

METHOD AND APPARATUS FOR USING GAME MECHANICS TO IMPLEMENT ENTERPRISE PRINT GOVERNANCE

The present disclosure relates generally to modifying a user's enterprise printing practices and, more particularly, to a method and apparatus for processing a request to print using game mechanics.

BACKGROUND

Many enterprise customers continue to look for ways to save costs from their infrastructure investments. Costs associated with printing are one factor associated with overall costs of enterprise customers. Various factors can influence the costs associated with printing and enterprise customers want ways to control these factors and costs.

Enterprise customers that generate large print volumes want insight into who is generating the print volumes so overages can be charged back to individuals or departments. Currently deployed enterprise print governance solutions have become ubiquitous, to the point where users often ignore pop-up messages associated with the enterprise print governance solutions or just click-through the messages without reading them.

SUMMARY

According to aspects illustrated herein, there are provided a method, a non-transitory computer readable medium, and an apparatus for processing a request to print. One disclosed feature of the embodiments is a method that receives one or more parameters associated with the request to print, calculates a score for the request to print based upon the one or more parameters, updates an overall score of a user associated with the request to print based upon the score that is calculated and presents the overall score that is updated to a display device of the user.

Another disclosed feature of the embodiments is a non-transitory computer-readable medium having stored thereon a plurality of instructions, the plurality of instructions including instructions which, when executed by a processor, cause the processor to perform a method that receives one or more parameters associated with the request to print, calculates a score for the request to print based upon the one or more parameters, updates an overall score of a user associated with the request to print based upon the score that is calculated and presents the overall score that is updated to a display device of the user.

Another disclosed feature of the embodiments is an apparatus comprising a processor that is configured to receive one or more parameters associated with the request to print, to calculate a score for the request to print based upon the one or more parameters, to update an overall score of a user associated with the request to print based upon the score that is calculated and to present the overall score that is updated to a display device of the user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for processing a request to print using game mechanics. As discussed above, currently deployed enterprise print governance solutions have become ubiquitous, to the point where users often ignore pop-up messages associated with the enterprise print governance solutions or just click-through the messages without reading them.

Thus, it would be advantageous to apply game mechanics to print governance solutions or any printing control mechanism to modify the behavior of users. For example, a point or scoring system may be established that reduces wasteful printing, encourages smarter use of printing resources and rewards users for modifying print jobs such that they are more economical when possible. A user's desire to "win" the game and peer pressure from other users viewing the published scores would result in a more efficient and economical use of printing resources.

Figure 1:
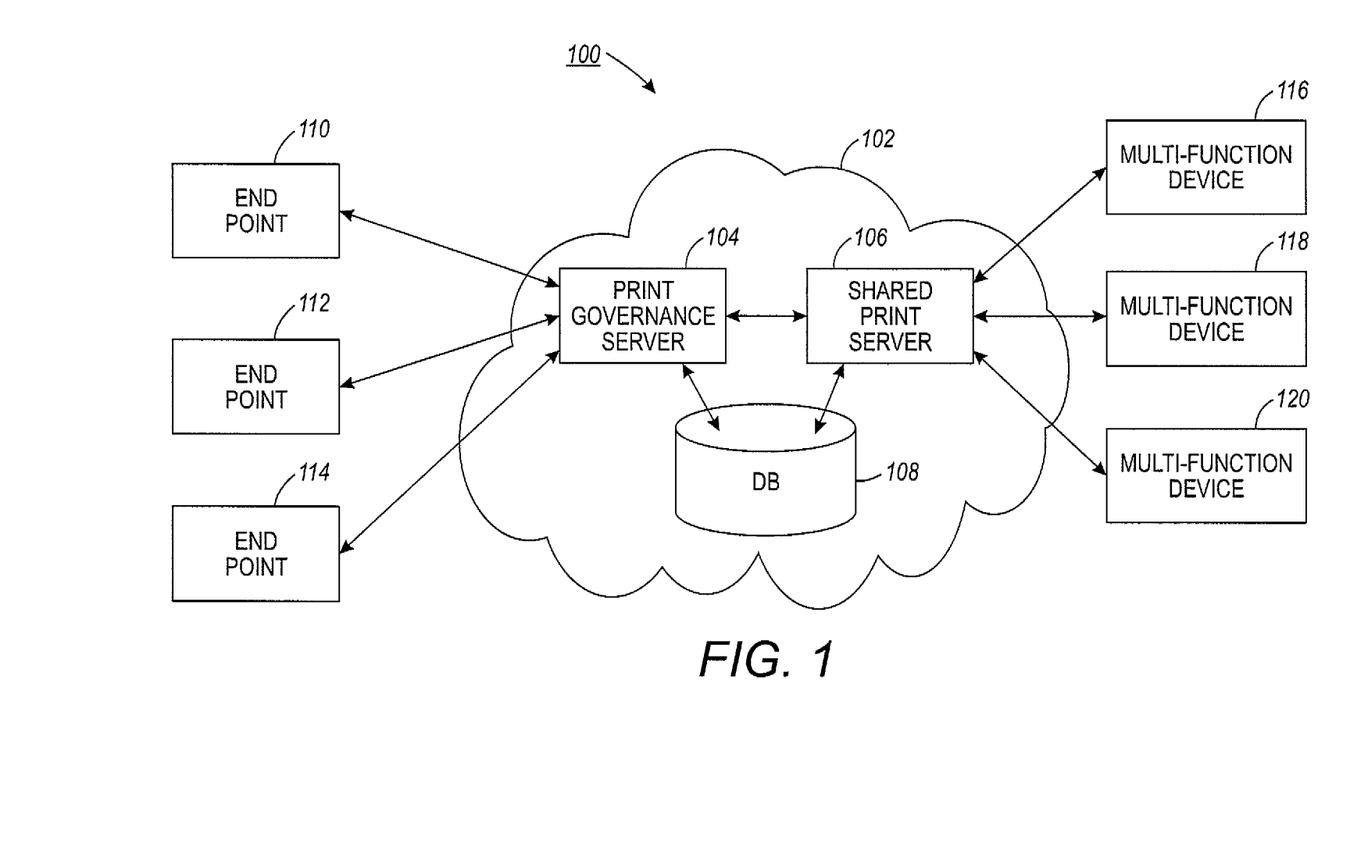
FIG. 1 illustrates one example of a communication network of the present disclosure.

To better understand the present disclosure, FIG. 1 illustrates an example of a communication network 100. In one embodiment, the communication network 100 includes an Internet Protocol (IP) network 102. The IP network 102 may be, for example, the Internet, a service provider network, an access network, a core network, a local area network (LAN), e.g., of an enterprise customer, and the like.

In one embodiment, the IP network 102 may include a print governance server 104, a shared print server 106 and a database (DB) 108. Although the print governance server 104, the shared print server 106 and the DB 108 are illustrated as separate hardware components in the IP network 102, it should be noted that functions of the print governance server 104, the shared print server 106 and the DB 108 may be incorporated into a single piece of hardware, such as a general application server in the IP network 102. In addition, although the print governance server 104, the shared print server 106 and the DB 108 are illustrated as being co-located in the same IP network 102, it should be noted that the print governance server 104, the shared print server 106 and the DB 108 may be placed in different locations in one or more different IP networks 102.

In one embodiment, one or more endpoint devices 110, 112 and 114 may be in communication with the IP network 102. The one or more endpoint devices 110, 112 and 114 may be modified to include a print client that operates with the print governance server 104 and displays one or more messages or graphical user interfaces discussed below. In addition, one or more multi-function devices 116, 118 and 120 may be in communication with the IP network 102.

In one embodiment, the one or more endpoint devices 110, 112 and 114 may be any device capable of communicating with the multi-function devices 116, 118 and 120, such as for example, a personal computer, a lap top computer, a tablet device, a smartphone, a cellular phone, a netbook, and the like. In one embodiment, the multi-function devices 116, 118 and 120 may include any device capable of printing, such as for example, a printer, a copying machine, a fax machine, and the like.

Although three endpoint devices 110, 112 and 114 are illustrated in FIG. 1, it should be noted that any number of endpoint devices may be deployed. Although three multi-function devices 116, 118 and 120 are illustrated in FIG. 1, it should be noted that any number of multi-function devices may be deployed.

In one embodiment, the print governance server 104 includes functions to track print jobs, collect information about the print jobs and control the authorization of each user that may send a print job to the multi-function devices 116, 118 and 120. For example, the print governance server 104 may track print quotas of each user, when a user is authorized to send a print job, which multi-function devices 116, 118 and 120 a user is authorized to use, whether the user is authorized to print in color, track how many pages are printed by each user, and the like. The print governance server 104 may be deployed by enterprises in conjunction with a service level agreement to achieve cost reduction goals.

In one embodiment, the print governance server 104 may also be modified to apply game mechanics to enterprise print governance. As noted above, enterprise print governance has become ubiquitous and users often ignore pop-up messages associated with these systems. To resolve this issue and improve the effectiveness of enterprise print governance, one embodiment of the present disclosure applies game mechanics to process a request to print.

In one embodiment, the shared print server 106 may direct the print job to the appropriate multi-function device. For example, if the print job is cleared by the print governance server 104, the print job may be routed to the appropriate multi-function device by the shared print server 106.

In one embodiment, the DB 108 may store various information associated with the user, the print jobs or game information. For example, the DB 108 may store a user's name, print authorizations, group associations, department, costs associated with printing on a particular multi-function device, a user's score, a group's score, information needed to calculate green points, and the like.

It should be noted that the network 100 has been simplified for clarity. For example, the network 100 may include other network elements such as border elements, routers, switches, policy servers, security devices, firewalls, a content distribution network (CDN) and the like. In addition, the network 100 may include additional networks between the endpoint 108 and the IP network 102 such as different access networks (e.g., a wired access network, a cable network, a wireless network, a cellular network, a Wi-Fi network, and the like) to reach the IP network 102.

Figure 2:
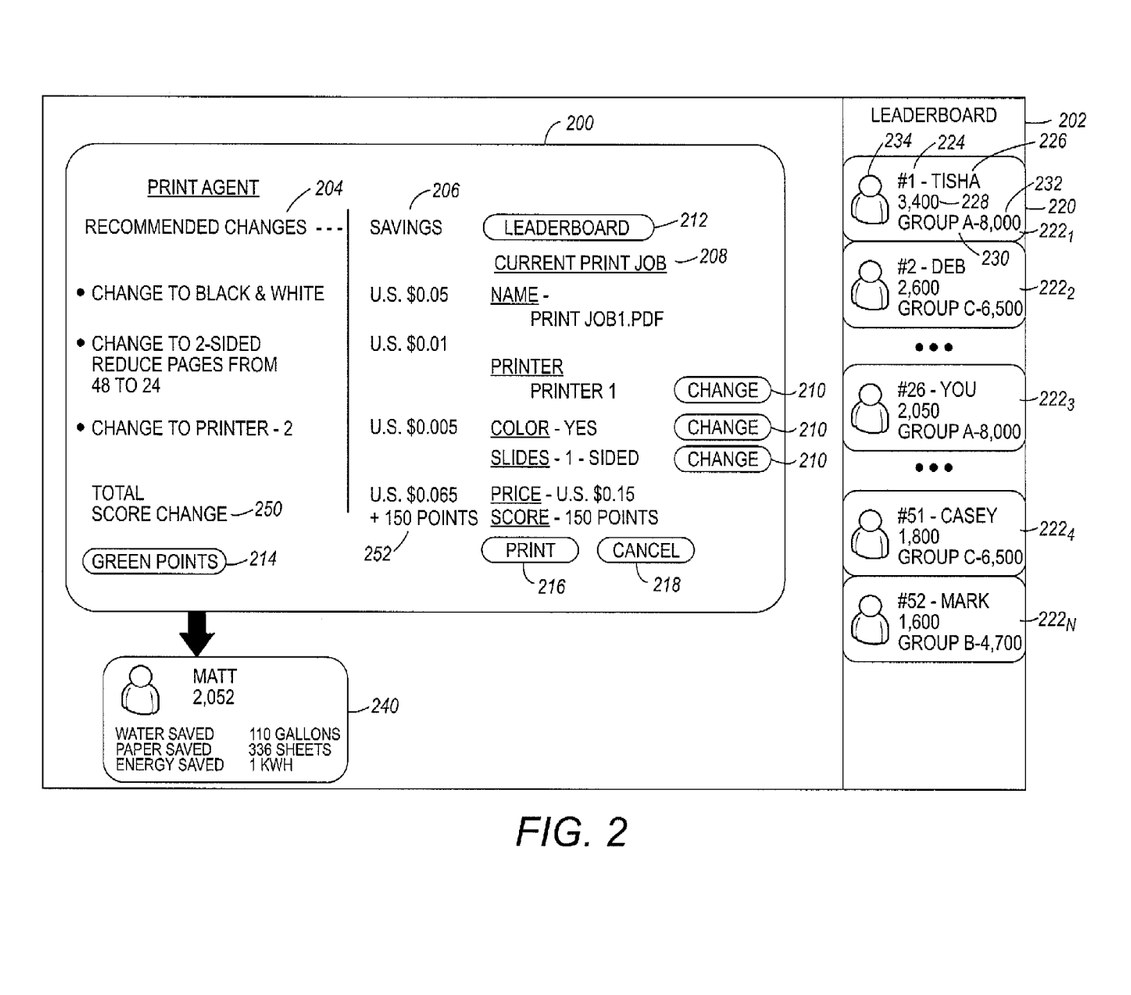
FIG. 2 illustrates an example graphical user interface of a print client of the present disclosure.

FIG. 2 illustrates an example graphical user interface of a print client on an endpoint device of the user that applies the game mechanics to a request to print. In one embodiment, a pop-up message 200 may be displayed to the user after a user submits a request to print to the shared print server 106 and is analyzed by the print governance server 104.

In one embodiment, the pop-up message 200 may include one or more recommended changes 204, a calculated savings 206 for each one of the one or more recommended changes 204, a description of the current print job 208, one or more change icons 210, a leader board icon 212, a green points icon 214, a print icon 216 and a cancel icon 218. In one embodiment, the print governance server 104 may analyze a request to print and determine whether any additional savings may be achieved by changing one or more parameters of the request to print. The one or more parameters may include any parameters associated with printing, such as for example, whether the request to print is in color, whether the request to print is in black and white, a number of pages, a particular printer or a particular type of printer associated with the request, a number of images in the request to print, a print quality associated with the request to print, whether the request to print is single sided, whether the request to print is double sided, whether the request to print is in a duplex, what time the request to print needs to be executed (e.g., during busy work hours or off-peak hours), and the like. It should be noted that the above only lists a few examples and is not intended to be limiting. Other types of parameters for printing may exist and are within the embodiments of the present disclosure.

To illustrate by example, a user may submit a request to print a color document, single sided, to an inkjet printer, printer_1, near his or her office. The request to print may be received by the print governance server 104. Upon analyzing the request to print, the print governance server 104 may determine that costs savings may be achieved by changing one or more parameters of the request. For example, the parameters that can be changed may include changing the request to print to black and white, printing double sided and sending the request to print to a multi-function printer/copier machine, printer_2, because the cost of ink and printing on printer_2 is significantly lower than the cost of ink and printing on printer_1.

This information and possible recommended changes may be sent to the user via the pop-up message 200. For example, the current print job section 208 of the pop-up message 200 may include the name of the request to print, and other parameters associated with the request to print. In this example, the parameters include a name of the printer, whether the request to print is in color, that the request to print is one-sided and the cost of printing using the currently requested parameters.

The pop-up message 200 may also include one or more recommended changes to reduce the cost of printing under the recommended changes section 204 for each one of the recommended changes. In addition, the savings 206 of each one of the recommended changes may be shown to the user. As a result, the user may quickly see the amount of savings that can be achieved by changing one or more parameters. The user may quickly determine that changing to black and white may save $0.05 per page, or 33% of the total cost to print per page. However, changing to a different printer may only save $0.005 per page, or 3.3% of the total cost to print per page. Thus, the user may decide that the savings in changing the printer is not worth walking down to printer_2 that is farther away from his or her office and choose only to change to black and white. In other words, the user may decide to make all of the recommended changes in the recommended changes section 204 or selectively choose one or more of the recommended changes in the recommended changes section 204.

In one embodiment, to help encourage the user to make the recommended changes, the pop-up message 200 may include one or more change icons 210 associated with each one of the recommended changes in the recommended changes section 204. As a result, to implement a change, the user may simply click on the respective change icon 210 and the print governance server 104 may automatically execute the change without having to navigate away to another pop-up window or another message.

As noted above, game mechanics may also be applied to the enterprise print governance. For example, each print job may be associated with a particular score to create a "competition" between users with respect to who can be the most efficient user with respect to print jobs. The users with the highest scores may be rewarded with prizes. In one embodiment, the scores may be converted into printing credits allowing a user to be allocated more color printing, more image printing, more printing to a convenient printer that may be more expensive, and the like. The printing credits may also be converted into prizes or gift cards.

In one embodiment, the "competition" may involve grouping the users by department or a user defined group of co-workers. For example, the department with the highest score may be rewarded with a lunch sponsored by the enterprise.

As a result, a score may also be associated with each request to print as listed in the description of current print jobs 208. In addition, the pop-up message may include a score change 250 with an amount of the score change 252 if the recommended changes in the recommended changes section 204 are implemented. In one embodiment, a score change may be provided for each one of the recommended changes in the recommended changes section 204 that are implemented. In another embodiment, to encourage maximum cost savings, the score change may be only implemented if the user makes all of the recommended changes. In other words, if the user decides to only implement one or two of the recommended changes, the user's score for the print job will remain the same. Thus, the user is provided an incentive to implement all of the recommended changes.

In one embodiment, the pop-up message may include the leader board icon 212. If the user clicks on the leader board icon 212, a leader board 202 may appear. The leader board 202 may be displayed in a separate window or pop-message or be displayed in the same window as the pop-up message 200.

In one embodiment, the leader board 202 may include one or more score icons $222_1$ to $222_n$ (hereinafter also referred to collectively as "score icons 222"). Each one of the score icons 222 may include a ranking indicator 224, a name 226, a total point score 228, a group identifier 230, a group score 232 and an avatar 234. In one embodiment, the ranking indicator 224 may be a numerical number from low to high, e.g., 1, 2, 3, 4, etc.

As noted above, the user may be associated with a group, for example, his or her department. The group identifier 230 may include the department of the user or a personalized group name.

In one embodiment, the avatar 234 may be a personalized avatar that is customizable by the user. For example, the avatar 234 may be a photo of the user, a graphic representing the user, and the like.

In one embodiment, the leader board 202 may list the top few users (e.g., the top ten users), the user currently sending the request to print (e.g., the score icon $222_3$) and the last few users (e.g., the bottom five users). As a result, a user may visually see where he or she is ranked in the game relative to other users.

In one embodiment, the leader board 202 may be sorted by various parameters. For example, the player may sort the leader board 202 by name, by group score 232, by group name 230, and the like. In another embodiment, the leader board 202 may also include rankings of the groups by the group score 232.

As a result, the users may compete between groups as well as at an individual level. The groups provide additional peer pressure to help modify behavior of the user with respect to print jobs if they are underperforming and dragging down a score of an entire group.

In one embodiment, the total point score 228 may be a rolling score based over a predefined period of time. For example, to keep the game "fresh" for all users, the total point score 228 may be kept for a rolling seven day period. In another embodiment, the total point score 228 may be reset to zero for all users on every Monday or every month. Other embodiments may be evident based upon the examples provided above and are within the scope of the present disclosure.

As noted above, the pop-up message 200 may also include the green points icon 214. In one embodiment, the green points icon 214 provides a green points window 240. The green points window 240 may be displayed in a separate window or pop-message or be displayed in the same window as the pop-up message 200.

The green points window 240 may provide information with respect to an amount of various resources that are saved by implementing the recommended changes 204. In one embodiment, the amount of resources that are saved may be tracked over the lifetime of the user, may be tracked on a rolling period, e.g., every week, or may be tracked for a predefined time period and reset to zero, e.g., once a month.

In one embodiment, the various resources may include an amount of water saved, an amount of paper saved and an amount of energy saved. It should be noted that the above are only a few examples and that other types of resources may also be included. The amount of resources saved may be calculated based upon an amount of resources it takes to print a single page. For example, it may be known that it takes x amount of water to print one page or it takes y amount of electricity for a particular printer to print one page. Thus, based upon the number of pages that are printed, the amount of resources that are saved may be calculated and tracked.

In one embodiment, the green points may be tracked as a separate score in addition to an overall point score 228 in the user's score icon $222_3$. In one embodiment, the overall point score 228 may be a function of the user's green points.

Providing the green points window 240 to the user may further encourage users to request more cost effective print jobs and reconsider whether certain parameters are necessary for certain print jobs. The green points window 240 illustrates to the user tangible savings rather than simply presenting cost savings in terms of dollars and cents.

Although an example of an arrangement of the pop-up message 200 is illustrated in FIG. 2, it should be noted that there are many possible arrangements for the different sections of the pop-up message 200. In addition, the pop-up message 200 may include additional sections, not shown, or fewer sections than illustrated in FIG. 2.

Figure 3:
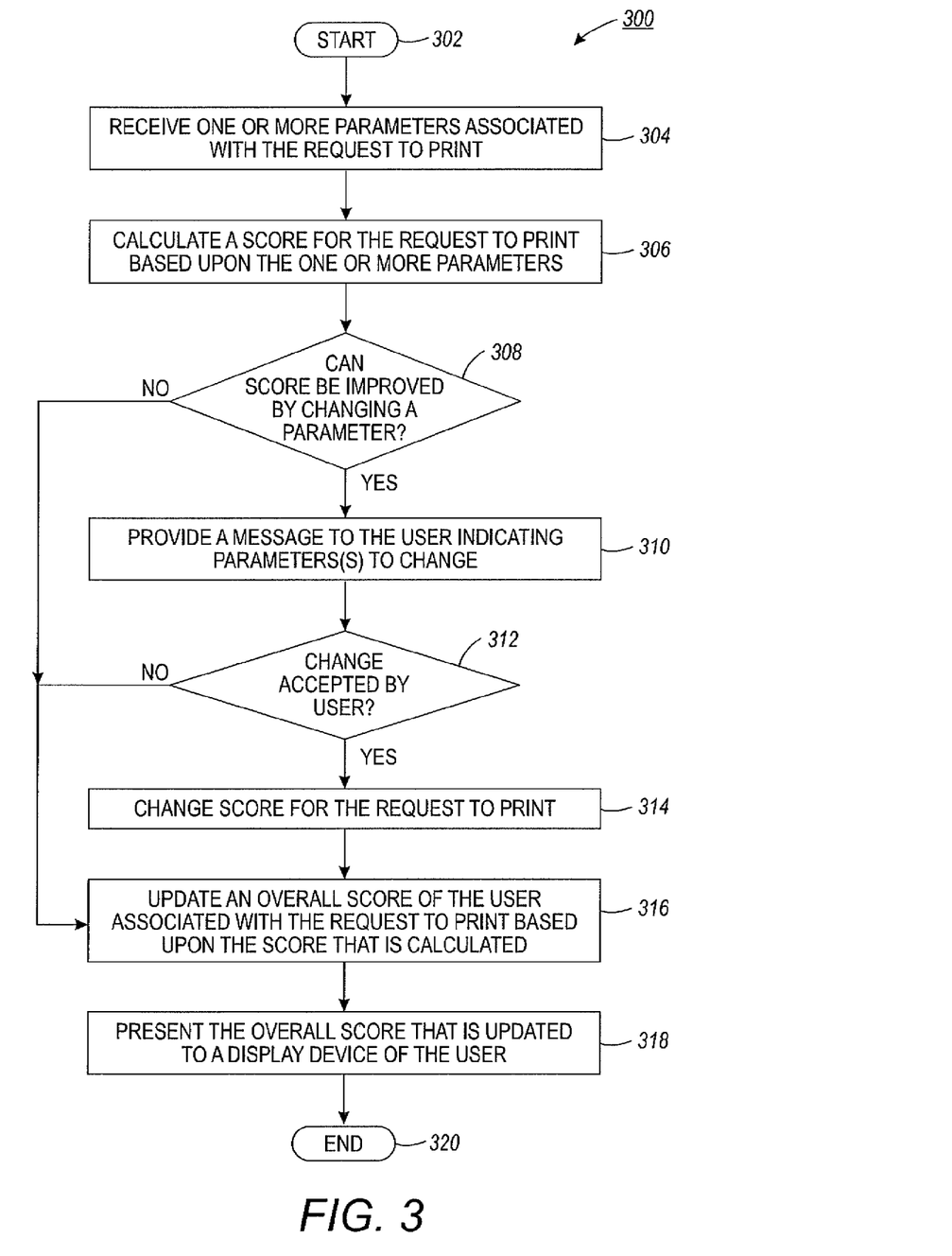
FIG. 3 illustrates an example flowchart of one embodiment of a method for processing a request to print using game mechanics.
Figure 4:
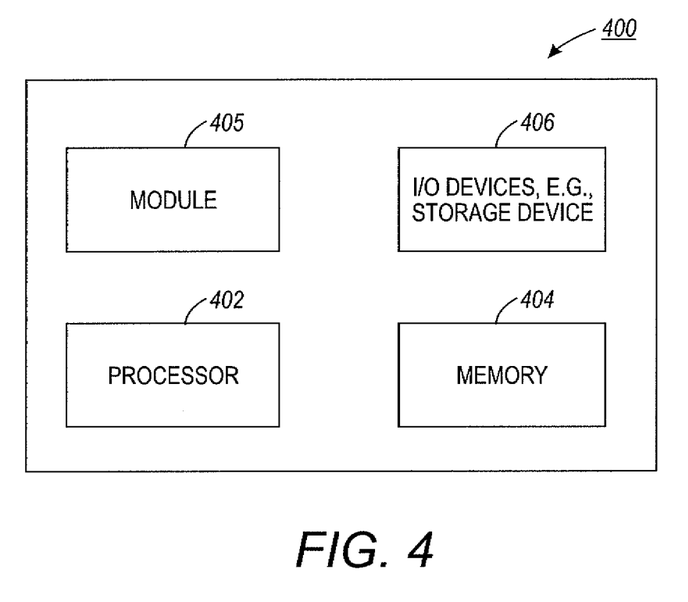
FIG. 4 illustrates a high-level block diagram of a general-purpose computer suitable for use in performing the functions described herein.

FIG. 3 illustrates a flowchart of a method 300 for processing a request to print using game mechanics. In one embodiment, the method 300 may be performed by the print governance server 104 or a general purpose computer as illustrated in FIG. 4 and discussed below.

The method 300 begins at step 302. At step 304, the method 300 receives one or more parameters associated with a request to print. For example, a request to print may be received that includes 200 pages single-sided in color, having four images and sent to printer "A". Printer "A" may be considered a relatively expensive printer as the cost to power the printer is higher than other printers, the cost of the ink is higher than other printers, and the like.

At step 306, the method 300 calculates a score for the request to print based upon the one or more parameters. Based upon the one or more parameters of the print request, a score can be calculated. The score may be calculated using any numerous methods. In one embodiment, parameters that are associated with a higher cost may affect the score negatively and parameters that are associated with a lower cost may affect the score positively. To illustrate, a request in color may be worth −10 points, but a request in black and white may be worth +10 points, whereas a single-sided request may be worth −1 point per page, but a double-sided request may be worth +1 point per page, and the like.

In another embodiment, the score may be calculated based upon a predetermined value of each one of the one or more parameters. For example, 10 points may be awarded for requests under 100 pages, 8 points for requests under 200 pages, and so forth, color requests may be worth 10 points versus black and white requests that are worth 20 points, single sided may be worth 1 point per page versus requests that are double sided may be worth 2 points per page, and the like.

In another example, the score may be based upon a cost of each one of the parameters. For example, the more expensive a parameter is, the less points may be awarded for the parameter.

At step 308, the method 300 determines if the score can be improved by changing a parameter. For example, the request to print may be analyzed to determine if one or more of the parameters can be changed to reduce the cost of the print request, and thereby, increase the score. To illustrate using the above example, it may be determined that changes to reduce the cost of the request to print and improve the score may include changing the request from color to black and white, printing four pages to a side to reduce the number of pages to 50, eliminating the images and sending the request to printer "B", which has lower ink cost and cost to operate than printer "A".

At step 308, if the score cannot be improved, the method 300 may proceed to step 316. However, if the score can be improved, the method 300 may proceed to step 310.

At step 310, the method 300 provides a message to the user indicating the parameter or parameters to change. In one embodiment, the message may include a pop-up message that is part of the enterprise print governance. One example of the message may be a pop-up message 200 illustrated in FIG. 2 above.

In one embodiment, the message may include a line by line listing of recommended changes for each parameter, an associated cost savings and an associated increase in score if the changes are made. In another embodiment, the message may simply include a paragraph questioning whether one or more parameters are needed and recommend the user to change the one or more parameters in question.

At step 312, the method 300 determines if the change is accepted by the user. For example, the message provided in step 310 may include a change icon for each one of the recommended changes. The change icon may provide an easy way for the user to simply click on the change icon and automatically have the selected change implemented without having to navigate away to another window and perform the change manually. In another embodiment, an options icon may appear that requires the user to navigate away to a print options window to manually change each parameter.

In one embodiment, the user may be required to accept all of the recommended changes to improve the user's score. In another embodiment, the user may be allowed to select one or more of the recommended changes without selecting all of the recommended changes. In other words, if the cost savings is insignificant, the user may desire to continue without changing certain parameters of the request to print.

At step 312, if the user does not accept any of the changes to one or more parameters that are recommended in step 310, the method 300 may proceed to step 316. However, if the user does accept at least one change to one or more parameters that are recommended in step 310, then the method 300 may proceed to step 314.

At step 314, the method 300 changes a score for the request to print. For example, the initial score may be modified by the indicated amount in the message at step 310. The change of the score may be calculated using a method consistent with the method selected to calculate the score in step 306.

In one embodiment, different methods may be used to calculate the scores at step 306 and at step 314. For example, to encourage users to change the parameters, accepted changes may be worth more points or bonus points.

At step 316, the method 300 updates an overall score of the user associated with the request to print based upon the score that is calculated. The overall score may be maintained for the user over a predefined period of time. For example, the overall score may never be reset and be a lifetime score of the user, the overall score may be maintained over a rolling predefined time period (e.g., 1 week, 1 month, etc.) or the overall score may be maintained for a predefined period (e.g., 1 month, 1 quarter, 1 year, etc.) of time and reset to zero each time the predefined period of time is reached.

Thus, once a score for the request to print is calculated, the overall score may be updated with the score for the request to print. For example, the score for the request to print may be added to the overall score.

At step 318, the method 300 presents the overall score that is updated to a display device of the user. For example, the overall score may be displayed to the user in a leader board window. The user may then see how he or she is performing relative to other users in the enterprise. The method ends at step 320.

It should be noted that although not explicitly specified, one or more steps of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for processing a request to print using game mechanics, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for processing a request to print using game mechanics can be loaded into memory 404 and executed by processor 402 to implement the functions as discussed above.

As such, the present method 405 for processing a request to print using game mechanics (including associated data structures) of the present disclosure can be stored on a non-transitory computer readable storage medium, e.g., RAM memory, magnetic or optical drive or diskette and the like. For example, the hardware processor 402 can be programmed or configured with instructions (e.g., computer readable instructions) to perform the steps of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing a request to print, comprising:
receiving one or more parameters associated with the request to print;
calculating a score for the request to print based upon the one or more parameters;
determining that changing one or more of the one or more parameters associated with the request to print would improve the score;
providing a pop-up message on a display device used for submitting the request to print indicating the one or more of the one or more parameters to change before printing a print job associated with the request to print;
displaying a leader board showing where an overall score of a user ranks relative to a respective overall score for each one of a plurality of users;
updating the overall score of the user associated with the request to print based upon the score that is calculated; and
presenting the overall score that is updated to the display device of the user.

2. The method of claim 1, wherein the one or more parameters comprise at least one of: whether the request to print is in color, whether the request to print is in black and white, a number of pages, a printer associated with the request to print, a number of images in the request to print, a print quality associated with the request to print, whether the request to print is single sided or whether the request to print is double sided.

3. The method of claim 1, wherein a higher cost associated with the one or more parameters affects the score negatively.

4. The method of claim 1, wherein a lower cost associated with the one or more parameters affects the score positively.

5. The method of claim 1, further comprising:
updating the leader board with the overall score.

6. The method of claim 1, wherein the message includes a difference in cost based upon changing the one or more of the one or more parameters.

7. The method of claim 1, wherein the message includes an indication of an amount of resources consumed by the request to print that were saved by changing the one or more of the one or more parameters.

8. The method of claim 7, wherein the amount of resources that were saved comprise at least one of: an amount of water saved, an amount of paper saved or an amount of energy saved.

9. The method of claim 1, further comprising:
issuing a printing credit to the user for each change that the user accepts.

10. A method for processing a request to print, comprising:
receiving one or more parameters associated with the request to print, wherein each one of the one or more parameters is associated with a cost;
calculating a score for the request to print based upon a respective cost associated with each one of the one or more parameters;
determining that changing one or more of the one or more parameters associated with the request to print would improve the score by reducing an overall cost of the request to print;
providing a pop-up message on a display device used for submitting the request to print indicating the one or more of the one or more parameters to change, wherein the message includes a difference in cost based upon changing the one or more of the one or more parameters and an indication of an amount of resources consumed by the request to print that were saved by changing the one or more of the one or more parameters;
displaying a leader board showing where an overall score of a user ranks relative to a respective overall score for each one of a plurality of users;
updating the overall score of the user associated with the request to print based upon the score that is calculated and any change to the one or more of the one or more parameters; and
presenting the overall score that is updated and the leader board updated to show where the overall score that is updated of the user ranks relative to the respective overall score for each one of the plurality of users to the display device of the user.

11. A non-transitory computer-readable medium storing a plurality of instructions, which when executed by a processor, cause the processor to perform operations for processing a request to print, the operations comprising:
receiving one or more parameters associated with the request to print;
calculating a score for the request to print based upon the one or more parameters;
determining that changing one or more of the one or more parameters associated with the request to print would improve the score;
providing a pop-up message on a display device used for submitting the request to print indicating the one or more of the one or more parameters to change before printing a print job associated with the request to print;
displaying a leader board showing where an overall score of a user ranks relative to a respective overall score for each one of a plurality of users;
updating the overall score of the user associated with the request to print based upon the score that is calculated; and
presenting the overall score that is updated to the display device of the user.

12. The non-transitory computer-readable medium of claim 11, wherein the one or more parameters comprise at least one of: whether the request to print is in color, whether the request to print is in black and white, a number of pages, a printer associated with the request to print, a number of images in the request to print, a print quality associated with the request to print, whether the request to print is single sided or whether the request to print is double sided.

13. The non-transitory computer-readable medium of claim 11, wherein a higher cost associated with the one or more parameters affects the score negatively.

14. The non-transitory computer-readable medium of claim 11, further comprising:

issuing a printing credit to the user for each change that the user accepts.

15. The non-transitory computer-readable medium of claim 11, wherein the message includes a difference in cost based upon changing the one or more of the one or more parameters.

16. The non-transitory computer-readable medium of claim 11, wherein the message includes an indication of an amount of resources consumed by the request to print that were saved by changing the one or more of the one or more parameters.

17. The non-transitory computer-readable medium of claim 16, wherein the amount of resources that were saved comprise at least one of: an amount of water saved, an amount of paper saved or an amount of energy saved.

18. The non-transitory computer-readable medium of claim 11, further comprising:
   updating the leader board with the overall score.

* * * * *